Figure 1:
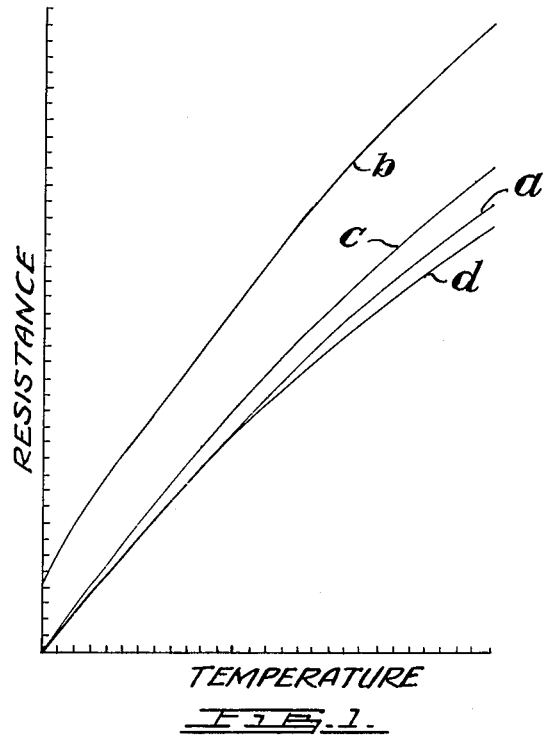

April 30, 1963 — T. McC. DAUPHINEE ET AL — 3,087,337
DIRECT READING RESISTANCE THERMOMETER
Filed April 28, 1958 — 3 Sheets-Sheet 1

INVENTORS
THOMAS M. DAUPHINEE
& HUGH PRESTON-THOMAS
BY — Smart & Biggar
ATTORNEYS

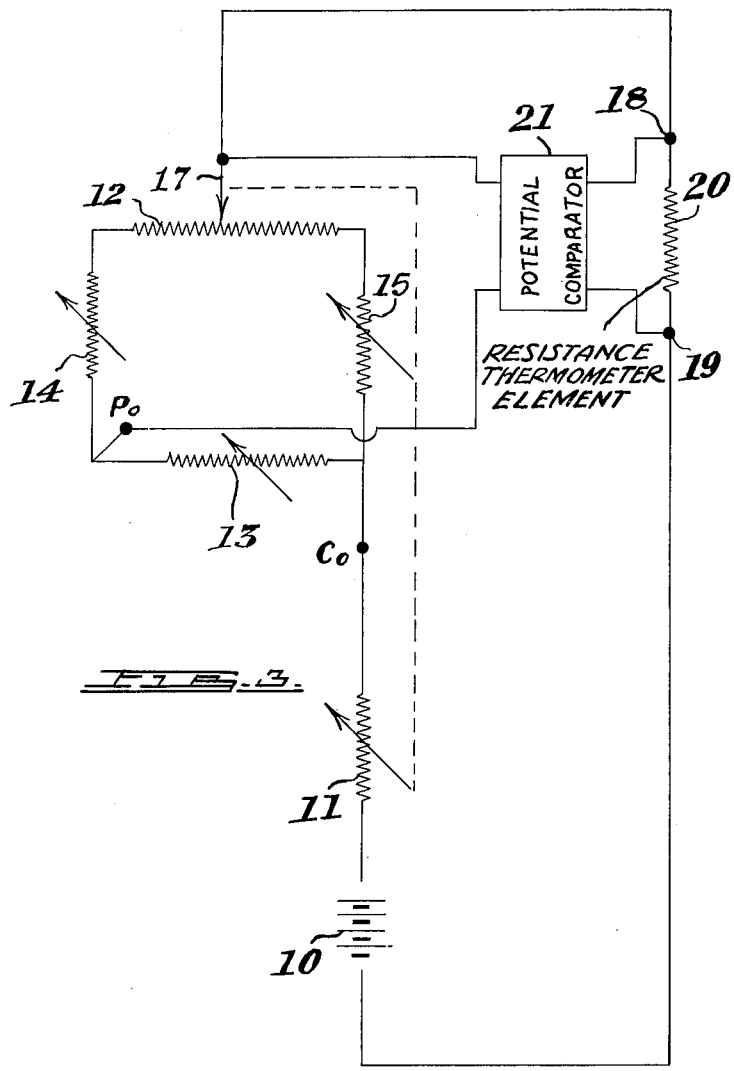

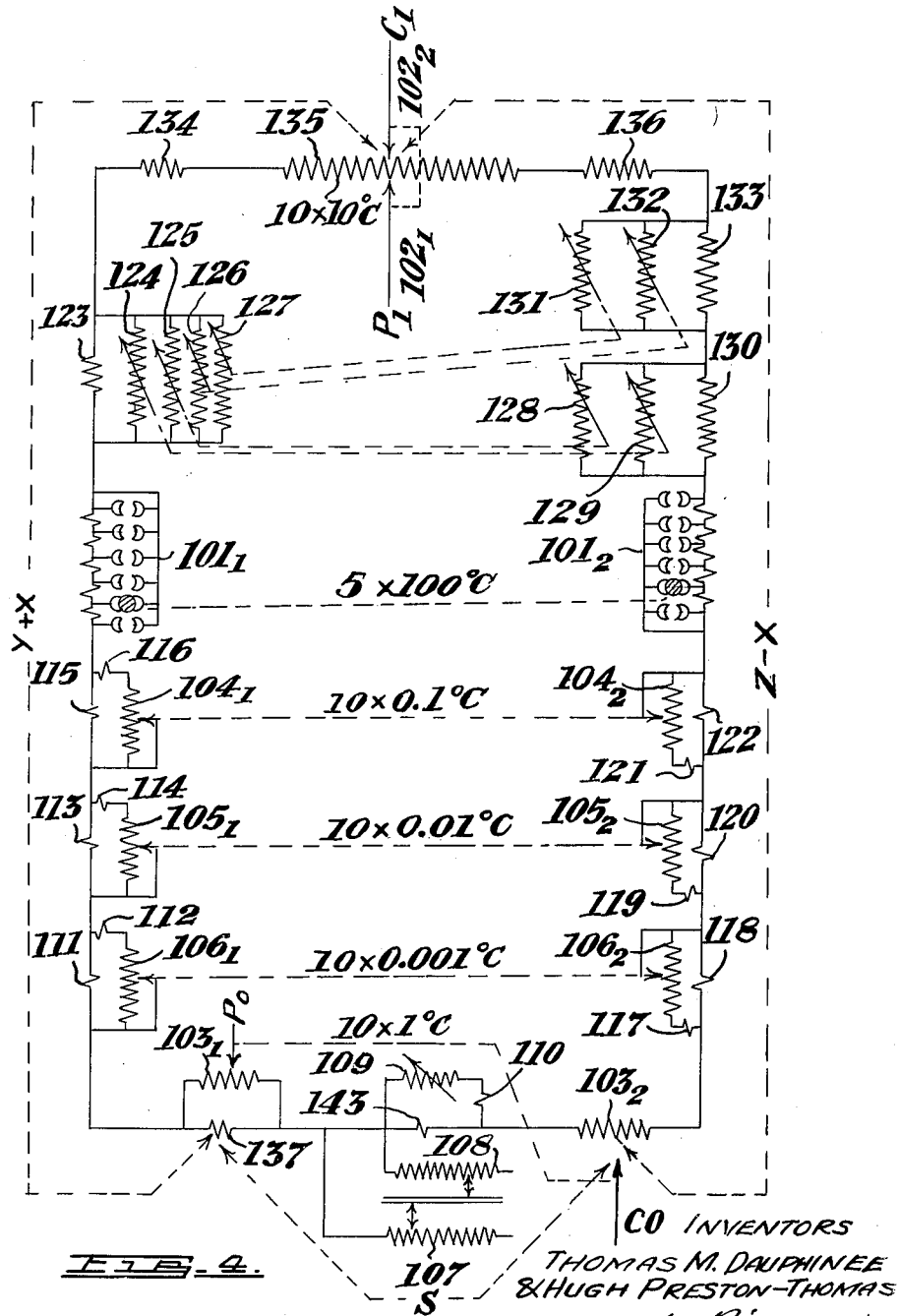

United States Patent Office 3,087,337
Patented Apr. 30, 1963

3,087,337
DIRECT READING RESISTANCE THERMOMETER
Thomas McC. Dauphinee and Hugh Preston-Thomas, Ottawa, Ontario, Canada, assignors to National Research Council, Ottawa, Ontario, Canada, a corporation of Canada
Filed Apr. 28, 1958, Ser. No. 731,262
3 Claims. (Cl. 73—362)

The present invention relates to an apparatus for obtaining direct readings of temperature from a resistance thermometer element.

The platinum resistance thermometer is commonly used to measure temperatures in the range from $-183$ to $+630°$ C., and is also used to define the international temperature scale between these temperatures. Above $0°$ C. the temperature/resistance relationship of the platinum resistance thermometer is by definition quadratic and below $0°$ C. a quadratic relationship is followed. The deviation from the quadratic relationship down to temperatures of $-50°$ C. is however very small. A good approximation of the temperature/resistance relationship of the platinum resistance thermometer in the range from $-50°$ C. to $+630°$ is therefore a quadratic equation. The quadratic equation commonly used to represent the temperature/resistance relationship of a platinum resistance thermometer is:

$$R_T = R_0(1+AT+BT^2) \qquad (1)$$

where $R_0$ is the resistance of the thermometer at $0°$ C.,
$R_T$ is the resistance of the thermometer at the particular temperature T, and
A and B are the two parameters of the quadratic equation of the thermometer. The parameters $R_0$, A, and B vary from thermometer to thermometer. The values of A for different thermometers are in a narrow range around $A=3.983\times10^{-3}$ and the values of B are in a narrow range around $B=-0.586\times10^{-6}$.

According to a known method of determining temperatures a platinum resistance thermometer is used and a measurement of the resistance of the thermometer element by means of known bridge circuits is required along with a calculation using the equation representing the temperature/resistance relationship of the thermometer element. An alternative known method of determining the temperature resistance relationship has been to prepare a complete table of temperature versus resistance readings on the thermometer, the temperature of the medium surrounding the platinum resistance thermometer then being determined by looking up in the table and interpolating if necessary.

According to the present invention the temperature of the medium surrounding a resistance thermometer element having a temperature/resistance relationship in accordance with Equation 1 may be found directly.

As will be discussed in more detail with respect to particular embodiments of the invention, a loop circuit comprising adjustable resistances is used to provide an electrical analogue of the resistance thermometer. If the numerical values of the parameters $R_0$, A and B are known for a particular resistance thermometer, the adjustable resistances in the loop circuit may be set to insert these values in the loop circuit. Thereafter, the total effective circuit resistance may be varied by means of a linear potentiometer. The effective resistance will vary according to the same quadratic equation as the rsistance thermometer, with variations in the effective resistance due to adjustment of the linear potentiometer being analogous to the variations in the resistance of the thermometer as the temperature of the medium surrounding it changes. The linear potentiometer is calibrated in terms of the temperature of the thermometer, so that by comparing the effective resistance of the loop circuit to the resistance of the thermometer, the temperature of the latter may be ascertained directly. If it is desired to utilize another thermometer having different values of parameters $R_0$, A and B, these new values are compensated by a resetting of the adjustable resistances in the loop circuit so that the loop circuit will behave as the electrical resistance analogue of the new thermometer. Variations in the resistance of the linear potentiometer will produce changes in the effective resistance of the circuit which correspond to the quadratic resistance equation of the new thermometer.

The present invention provides an apparatus for indicating directly the temperature of the medium surrounding a resistance thermometer element having a relationship of temperature to resistance which may be defined by the equation $$R_T = R_0(1+AT+BT^2)$$

The apparatus comprises a source of direct current; a pair of connections for connection to a resistance thermometer element; a loop circuit having connected in this order a first adjustable resistance, a second adjustable resistance, a calibrated potentiometer having a resistance element and a variable contact for this element, there being a linear relationship betwen the calibration of the potentiometer and variation of the resistance between the contact and each end of the resistance element, and a third adjustable resistance. The loop circuit has a pair of current connections, one of the current connections being the junction of the first and third adjustable resistances, the other of the current connections being the variable contact of the linear resistance potentiometer. The loop circuit also has a pair of potential terminals, one of the potential terminals being the junction of the first and second adjustable resistances, the other of the potential terminals being the variable contact of the linear resistance potentiometer. The apparatus includes means adapted to compare the potential difference between the connections for connection to a resistance thermometer element and the potential difference between the potential terminals of the loop circuit. The source of direct current, the pair of connections for connection to a resistance thermometer element and the current connections of the loop circuit are connected in a series circuit. The first adjustable resistance is adapted to compensate for variations in $R_0$ of the resistance thermometer element, the second and third adjustable resistances are adapted to compensate for variations in A and B.

The above apparatus provides for the direct indication of temperature of the medium surrounding a resistance thermometer element. When the parameters $R_0$, A and B have been compensated by the adjustments available in the apparatus, the temperature of the medium surrounding the thermometer element is determined by adjusting the potentiometer until the potential comparing means shows equal potential differences between the potential terminals and the connections to the thermometer element. The calibration of the potentiometer indicates the temperature of the medium surrounding the thermometer element. If current control means are connected in series with the source of direct current then the readings of the potential comparing means other than the null reading may be used to indicate temperature.

Figure 2:
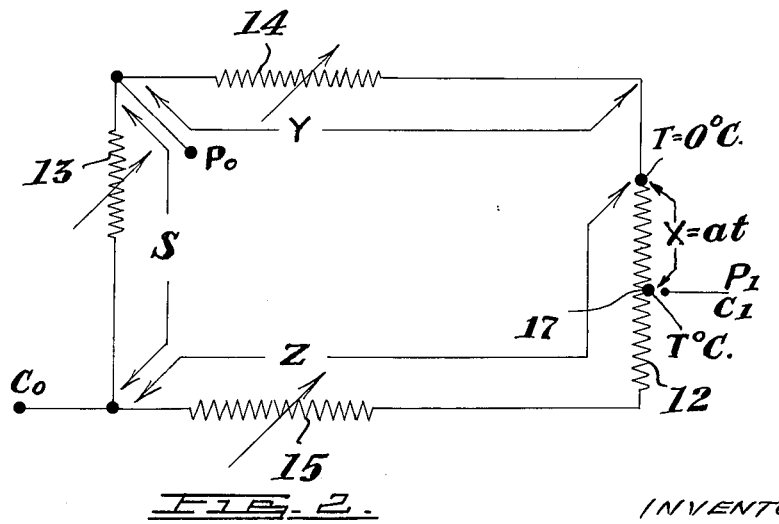

The invention will be described in more detail with reference to the attached drawings in which:

FIGURE 1 is a graph showing a family of curves of temperature/resistance relationship of typical resistance thermometer elements, FIGURE 2 is a schematic diagram of a circuit which may be used in a direct reading resistance thermometer apparatus, FIGURE 3 is a schematic diagram of an apparatus adapted to indicate directly the temperature of the medium surrounding a resistance thermometer element, and using the circuit of FIGUE 2, and FIGURE 4 is a schematic diagram of an apparatus according to the invention which may be used for precise temperature determinations.

Curve $a$ of FIGURE 1 is a graph showing the temperature/resistance relationship for a typical platinum resistance thermometer. A variation of the parameter $R_0$ defined above varies the overall size of the curve as shown by curbe $b$, a variation in the parameter $A$ varies the initial slope as shown by curve $c$, and a variation in the parameter $B$ varies the curvature as shown by curve $d$.

In order that a direct reading resistance thermometer be of the maximum utility, it is necessary that corrections for variation in the three parameters of the thermometer be incorporated into the circuit of the direct reading resistance thermometer. FIGURE 2 is a schematic diagram of a circuit which is capable of correcting for variations in the three parameters and has a linear temperature/resistance calibration. FIGURE 2 shows a linear potentiometer 12 with a variable contact 17 connected in series with adjustable resistances 13, 14 and 15 respectively. A pair of current connections $C_0$ and $C_1$ are provided for the circuit. The $C_0$ connection is formed by the junction between adjustable resistances 13 and 15 and the $C_1$ connection is formed by the variable contact 17. A pair of potential terminals are also provided for the circuit, the first of which is the terminal $P_0$ connected to the junction of the adjustable resistances 13 and 14 and the second is the terminal $P_1$ connected to the variable contact 17. The symbols $X$, $Y$, $Z$ and $S$ are used to indicate the resistance between the points as marked on FIGURE 2. In the following discussion of FIGURE 2, reference is made to the effective not actual resistance of the circuit. This effective resistance is the ratio of the potential difference between the potential terminals $P_1$–$P_0$ and the current flowing between current connections $C_1$ and $C_0$. The effective resistance, $R_{eff}$, of the circuit illustrated in FIGURE 2 may be shown to be $$\frac{P}{C}=R_{eff}=\frac{ZY}{Z+Y+S}\left\{1+\frac{(Z-Y)}{ZY}X-\frac{(1)}{ZY}X^2\right\} \quad (2)$$

which is in form equivalent to Equation 1, that is $$R_T=R_0(1+AT+BT^2)$$

where $B$ is negative when $X$ is calibrated linearly in terms of $T$. Equation 2 corresponds to Equation 1 when the potentiometer 12 is linearly calibrated in terms of temperature. Parameters $A$ and $B$ can be compensated by independent variations of the adjustable resistances 14 and 15 subsequent to which, the variations in $R_0$ may be compensated by varying adjustable resistance 13. Variation of $S$ as may be seen from Equation 2 clearly does not effect the compensation for the parameters $A$ and $B$. It may thus be seen that the circuit of FIGURE 2 corresponds exactly with the requirements of resistance thermometry. The parameters $A$ and $B$ are known for each individual thermometer and may be preset in the apparatus, and the parameter $R_0$ may be determined by an ice point measurement.

FIGURE 2 may be adapted to compensate for parameters $A$, $B/A$ and $R_0$ in place of parameters $A$, $B$ and $R_0$. The values of the adjustable resistances 13, 14 and 15 are more convenient when the parameters $A$, $B/A$ and $R_0$ are used.

Equation 2 may be rearranged in the form $$R_{eff}=\frac{ZY}{Z+Y+S}\left\{1+\frac{(Z-Y)}{ZY}a.T-\frac{(Z-Y)}{ZY}a.\frac{(a)}{Z-Y}T^2\right\}$$

(3)

which corresponds to $$=R_0\left\{1+AT+A\cdot\frac{B}{A}\cdot T^2\right\}$$

where $aT=X$.

Since the terms in Equation 3 which correspond to the parameters $R_0$, $A$ and $B/A$ are all dependent upon the values of $Z$ and $Y$, certain procedures based upon an analysis of the equation must be followed before the adjustment of one term in the equation can be varied without varying the values of the other terms.

The successful procedure is first of all dependent upon the sequence in which the terms are adjusted. Either the $A$ or $B/A$ term may be set first by adjustment of the $Z$ and $Y$ resistances and then the other of the terms may be set without varying the value of the first set term if the $Z$ and $Y$ resistances are varied in accordance with certain established relationships to be discussed below. The value of the $R_0$ term in Equation 3 is always the final setting made since the $S$ resistance does not appear as a factor in the $A$ and $B/A$ terms. This means that the value of the $R_0$ term can be set by variation of the $S$ resistance alone.

The procedure, as was noted above, is also dependent upon the relationship maintained between the $Z$ and $Y$ resistances as these resistances are varied to set the $A$ or $B/A$ term after the other of the two terms has been set.

In the first case it will be assumed that the $B/A$ term has been set by variation in the $Z$ and $Y$ resistances according to the relation:

$$\frac{B}{A}=\frac{1}{Z-Y}$$

It is now necessary to vary the $Z$ and $Y$ resistances to set the $A$ term without varying the already established $B/A$ term. It may be shown from an analysis of the $B/A$ term that it will remain constant for all incremental changes in $Z$ and $Y$ provided that $d(Z-Y)=0$ which is achieved when $dZ=dY$. This means that the $A$ term may be set without changing the $B/A$ term if the incremental changes in $Z$ and $Y$ are maintained equal and of the same sign (i.e.: either both increasing or both decreasing). The value of the equal increments in $Z$ and $Y$ to adjust the $A$ term may be determined from the fact that $$A=\frac{Z-Y}{ZY}$$

Finally, the value for $R_0$ is set by varying the $S$ resistance.

In the second case it will be assumed that the $A$ term has been set by variations in $Z$ and $Y$. To set the $B/A$ term without changing the $A$ term requires that $$\frac{d(Z-Y)}{ZY}=0$$

which is brought about when $$\frac{dZ}{dY}=\frac{Z^2}{Y^2}$$

Because the changes in $Z$ and $Y$ will be small in comparison with the absolute magnitude of $Z$ and $Y$, it is possible to calculate the incremental change in $Z$ required for a given incremental change in $Y$ or vice versa. Using the established relationship between $dZ$ and $dY$ the $B/A$ term may be set without varying the already established value of $A$. Again, the final adjustment is for $R_0$ by changing the $S$ resistance.

In practice, the range of $A$ adjustments will be from $3.978\times10^{-3}$ to $3.988\times10^{-3}$ and that for $B/A$ will be from $-0.1466\times10^{-3}$ to $-0.1476\times10^{-3}$. In a circuit where $Y=27.02992\Omega$ and $Z=784.8874\Omega$, to adjust $A$ over its total range with $B/A$ constant requires a change of $\Delta_Y=\Delta_Z=-0.065\Omega$. In the same circuit, to adjust over the full range of $B/A$ with $A$ held constant requires a change of $-5\Omega$ in $Z$ and of $-0.006\Omega$ in $Y$. The values shown for the variation of $B/A$ with A constant are related by the fact that $$\frac{dZ}{dY} = \frac{Z^2}{Y^2}$$

as has been discussed previously.

FIGURE 3 is a schematic diagram of the complete circuit of apparatus for obtaining direct temperature readings from a resistance thermometer element. A battery 10 is connected in series with a current control resistor 11 ganged to the variable contact 17 of the potentiometer 12. The current connections $C_0$ and $C_1$ of the loop circuit illustrated in FIGURE 2 are connected in series with the current control resistor 11. The loop circuit consists of adjustable resistances 13, 14, 15 and the linear potentiometer 12. The two current connections $C_0$, $C_1$ of the loop circuit are formed as before by the junction of adjustable resistances 13 and 15 and the variable contact 17 of the potentiometer 12. The potential terminals are similarly formed by the junction of variable resistors 13 and 14, and the variable contact 17 of the potentiometer 12. The variable contact 17 of the potentiometer 12 is connected in series with a connection 18 and a connection 19 to which a resistance thermometer element 20 such as a platinum resistance thermometer is connected. A potential comparator such as that described in United States Patent 2,798,198, issued July 2, 1957 to T. M. Dauphinee, is connected between the potential terminals $P_0$ and $P_1$ of the loop circuit and terminals 18 and 19 to which the thermometer element 20 may be connected.

In operation, the battery 10 supplies current in the series circuit which includes the thermometer element 20. The potentiometer 12 is calibrated in terms of temperature and each equal increment of resistance corresponds to an equal increment in temperature of the medium surrounding the resistance thermometer element 20. The current control resistor 11 is mechanically ganged to the variable contact 17 of the potentiometer 12 and is adapted to decrease the current flowing through the series circuit with increases in temperature. The temperature of the thermometer is determined by comparing the potential drop across the thermometer element with the potential drop between the terminals $P_1$ and $P_0$ of the loop circuit. When these two potential drops are equal the displacement of the variable contact 17 relative to the calibration of the resistance element of the potentiometer will indicate the temperature of the medium surrounding the thermometer element 20. In order to equalize these two potentials, the variable contact 17 is displaced relative to the resistance element of the potentiometer 12. The essential purpose of current control resistor 11 is to insure that an incremental error in the difference between the setting of the variable contact 17 and the resistances of the thermometer element 20 will produce the same indication of the potential comparator regardless of the temperature of the medium surrounding the resistance thermometer element.

The potential comparator 21 which measures the residual potential difference between the voltage drop across the resistance thermometer element 20 and the voltage difference between the terminals $P_1$, $P_0$ has a zero reading whenever the resistance of the resistance thermometer element is equal to the effective resistance of the loop circuit and at these settings the precise value of the current through the circuit is immaterial since the potential comparator is not deflected. At other than balance conditions, the indication of the potential comparator will be a function of the current flowing through the circuit and the incremental difference in resistance between the platinum resistance thermometer and the setting of the resistance circuit. The incremental difference in resistance with respect to increments of temperature is not a constant because of the curvature of the thermometer characteristic as shown in FIGURE 1, i.e. at high temperatures the incremental difference in resistance for 1° C. is up to 20% less than the incremental difference of resistance for 1° C. at low temperatures.

In order to maintain constant potential comparator indication for a constant difference between the temperature of the medium surrounding the thermometer element and the setting of the variable contact regardless of its position in the range, the current supplied through the circuit must increase as the ratio of the incremental resistance to increment temperatures decreases. The accuracy of the current setting must be the accuracy required for the deflection measurement i.e. of the order of .1 to .2%. The accuracy of temperature reading is about 500 times this, but only the unbalanced part of the difference in incremental resistance is current dependent so relatively rough current adjustment is quite adequate.

A circuit showing the use of the above principles to give an instrument capable of considerable precision of reading without the danger of errors caused by contact resistances is shown in FIG. 4.

FIGURE 4 illustrates a loop circuit similar to that shown in FIGURE 2 with appropriate modifications to provide the additional accuracy required in normal temperature determinations. The components forming the variables $Y+X$, $Z-X$ and S are shown by dotted lines in the figure.

The provision of additional dials to give finer subdivision of temperature must be accomplished without causing changes of the total effective resistance of the loop ZYS or of S as these dials are moved, since only then will the preset values of A, $B/A$ and $R_0$ remain constant. In order to change the temperature setting the effective resistance from $P_0$ through the Y side to $P_1$ must increase and the resistance from $C_0$ through the Z side to $C_1$ decrease by identical amounts and linearly with T. This has been accomplished through the use of ganged variable resistances $101_1$, $101_2$; $102_1$, $102_2$; $103_1$, $103_2$; $104_1$, $104_2$; $105_1$, $105_2$; $106_1$, $106_2$. The connection to the variable resistances are made in such a manner that the resistance added to the Y side of the loop circuit by the subscript 1 variable resistances is simultaneously subtracted from the Z side of the circuit by the subscript 2 variable resistance of that pair of ganged variable resistances. The variation of resistances 101 and $101_2$ is accomplished by plug switches which are extremely stable and reliable in their operation. The $103_1$, $103_2$ variable resistances on either side of the network designated as S, are ganged in a differential manner so that any resistances added by variable resistance $103_1$ is subtracted by variable resistance $103_2$ simultaneously.

Resistances 123 to 133 inclusive are provided to compensate for variations from the median value of the variable parameters A and $B/A$. Variation in the parameter $R_0$ is compensated by the S network comprising variable resistances 107, 108 and 109 and fixed resistances 110 and 123.

The circuit shown in FIGURE 4 permits the use of a decade system for dials and each dial, except the 100° dial, has a range of values from 0 to 10. The resistors of the dials can therefore be intercompared by the procedure sometimes called autocalibration or substitution calibraton in which the whole change of one dial (10 steps) is compared with any one step of the next higher dial. The arrangement shown in FIGURE 4 permits setting of the Y and Z sides of the loop circuit to $1/10^{3°}$ C. (approximately one ten thousandth of an ohm) without introducing uncertainty or instability from switch contacts as large as one smallest division. The arrangement used is very similar to that used in a conventional Mueller bridge but with double dials. Variable resistances 101 have plug contacts, variable resistances 104, 105 and 106 are made up of the conventional Waidner-Wolff elements. Variable resistance 102 has two sets of contacts so that the voltage drop across the current carrying contact and its lead will not be introduced into the potential comparator circuit. Variable resistor 103 has two moving contacts for the same reason and also because the S circuit must be introduced between them. It is possible to use a so called "Shunted dial" for variable resistance 103, because the switch contact carries no current at balance.

In the circuit shown the small adjustments to Y and Z required to allow for different values of A and B/A are made by changing the appropriate resistance networks which are shunted across parts of the Y and Z networks. Variable resistances 131 and 132, which are in parallel with fixed resistance 133, are mechanically ganged to variable resistances 127 and 126 respectively, which are in parallel with variable resistances 124 and 125 as well as fixed resistance 123. The mechanical connection between resistors 126 and 132 is such that equal increments of resistance are added to both the $Y+X$ and $Z-X$ sides of the circuit as one or other of the resistances is varied. This relation satisfies the condition that $dY=dZ$ which permits changes in A while B/A (which it is assumed has been set previously) remains constant. The combination of ganged resistances 127 and 131 performs precisely the same function for fine adjustments of A while B/A remains constant.

Variable resistances 124 and 125 are mechanically ganged to variable resistances 129 and 128 respectively, the latter pair of resistances being in parallel with fixed resistances 124, 129 and 125, 128 are chosen so that for any change in the resistances 128 and 129 on the $Z-X$ side of the circuit, change of the corresponding resistances 125 and 124 will occur such that $$\frac{dY}{dZ}=\frac{Y^2}{Z^2}$$

This relationship is such that B/A can be varied without changing the value of A (assuming this latter value to have been set previosuly).

With these values the circiut of FIGURE 4 may be used for the measurement of temperatures from 0° C. to 611° C. The circuit may be altered to provide operation down to —50° C. by inserting a further resistance segment on variable resistances $101_1$ and $101_2$. This extra resistance segment should have a value which would provide for the extra 50°. If the circuit is modified to provide for operation to —50° C. the error introduced by deviation of operation of the circuit from the defined characteristics of a platinum resistance thermometer element will be approximately 0.020° at —50° C. It is possible to correct for this minor error by means of an additional correcting circuit (not shown) ganged to variable resistances 101, 102 and 103 and operating on the same resistor as the A and B/A adjustments. The correction required need ony be made on the Y side of the loop circuit as the total change is very small.

What we claim as our invention is:

1. Apparatus for obtaining direct temperature reading from a resistance thermometer element having a relationship of temperature to resistance which may be defined by the equation $$R_T=R_0 \ (1+AT+BT^2)$$

where $R_T$ is the resistance of the resistance thermometer element at temperature T, $R_0$ is the resistance of the resistance thermometer at 0° C., A and B are the two parameters of the quadratic equation expressing the temperature resistance relationship of the resistance thermometer element, said apparatus comprising a source of direct current; a pair of connections for connection to a resistance thermometer element; a loop circuit having connected in this order a first adjustable resistance, a second adjustable resistance, a potentiometer calibrated in temperature having a resistance element and a variable contact for this element, there being a linear relationship between the calibration of the potentiometer and variation of the resistance between the contact and each end of the resistance element, and a third adjustable resistance; said loop circuit having a pair of current connections, one of said current connections being the junction of said first and third adjustable resistances, the other of said current connections being the variable contact of said potentiometer; said loop circuit also having a pair of potential terminals, one of said potential terminals being the junction of said first and second adjustable resistances, the other of said potential terminals being the variable contact of said potentiometer; said source of direct current, said pair of connections for connection to a resistance thermometer element and said current connections of said loop circuit being connected in a series circuit; and means for comparing the potential difference between said connections for connection to a resistance thermometer element and the potential difference between said potential terminals of said loop circuit to indicate the difference between the temperature of the resistance thermometer element and the temperature indicated by said calibrated potentiometer; said first adjustable resistance element for compensating for variations in $R_0$, said second and third adjustable resistance elements for compensating for variations in A and B.

2. An apparatus as claimed in claim 1, comprising means for controlling the current output of said source of direct current.

3. An apparatus as claimed in claim 2, wherein said means for controlling the current output of said source of direct current is mechanically interconnected with the variable contact of said potentiometer.

References Cited in the file of this patent
UNITED STATES PATENTS

| | | |
|---|---|---|
| 2,399,903 | Anderson | May 7, 1946 |
| 2,711,650 | Weisheit | June 28, 1955 |
| 2,728,832 | Hoffman | Dec. 27, 1955 |